Patented Mar. 3, 1942

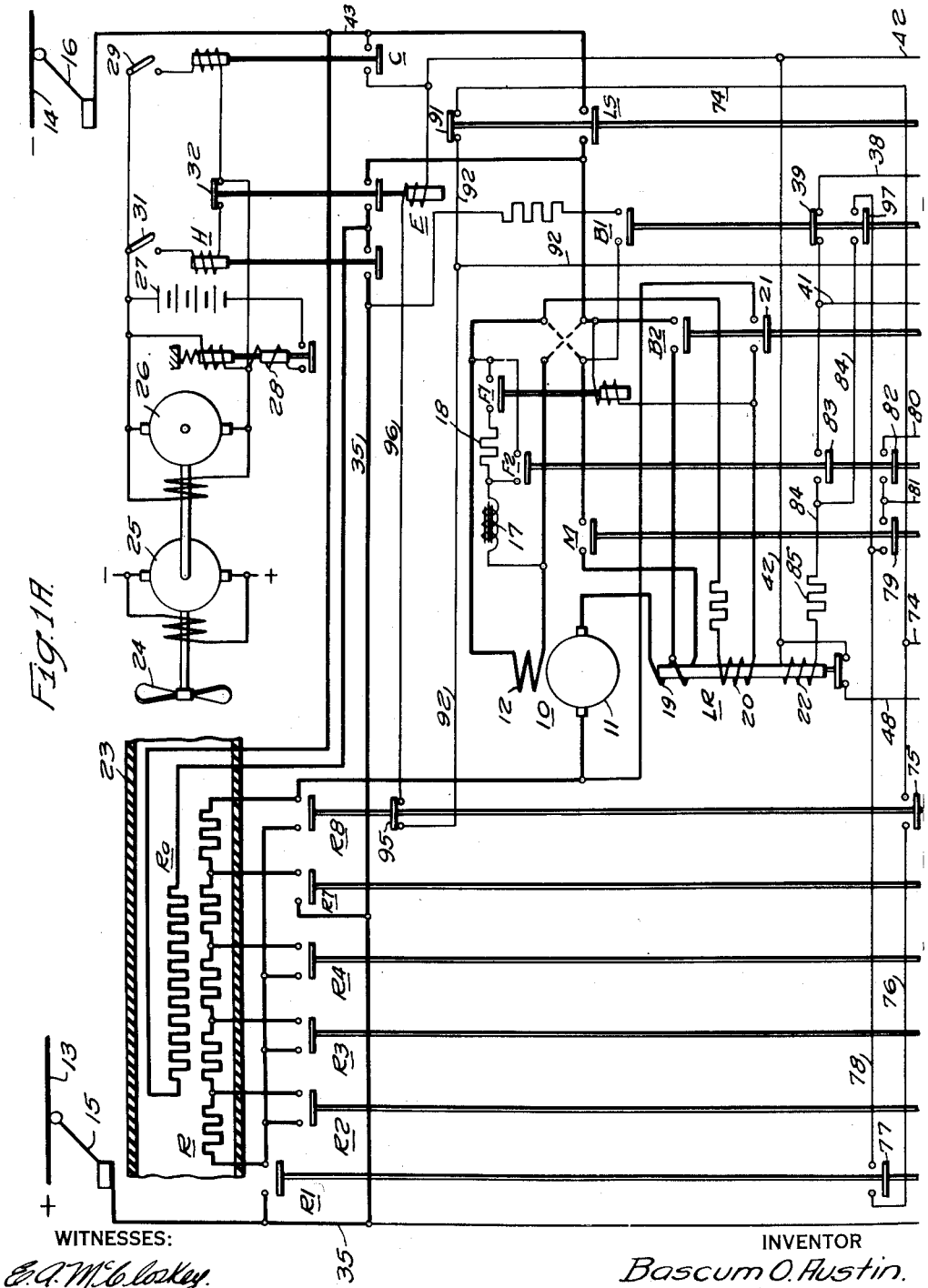

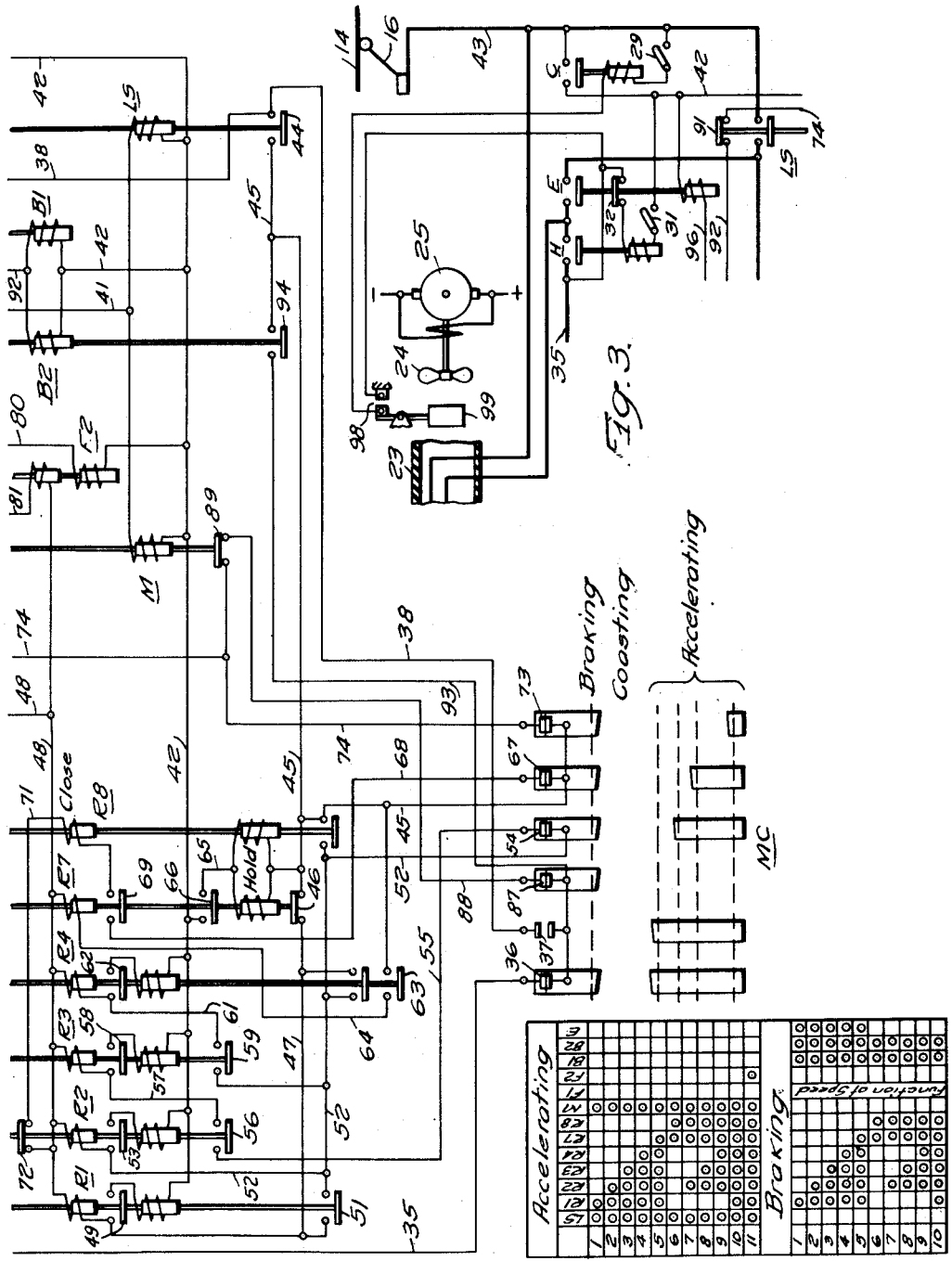

2,274,646

UNITED STATES PATENT OFFICE 2,274,646

MOTOR CONTROL SYSTEM

Bascum O. Austin, Wilkinsburg, Pa., assignor to Westinghouse Electric & Manufacturing Company, East Pittsburgh, Pa., a corporation of Pennsylvania Application September 19, 1940, Serial No. 357,387

10 Claims. (Cl. 172—179)

My invention relates generally, to motor control systems and, more particularly, to systems for controlling the operation and the heating of electric vehicles, such as trolley cars and buses.

It is the usual practice to utilize the heat obtained from the accelerating and braking resistors on trolley cars and buses for heating the vehicle, and sufficient heat is usually obtained from this source to keep the vehicle warm while it is in actual operation. However, it is necessary to provide a source of auxiliary heat for preheating the vehicle before starting on a run and, under extreme weather conditions, to supplement the heat obtained from the accelerating resistors.

An object of my invention generally stated, is to provide a control and heating system for an electrically propelled vehicle which shall be simple and efficient in operation and which may be economically manufactured and installed.

A more specific object of my invention is to provide for utilizing a resistor for flashing the field of the vehicle motor during the initial stage of dynamic braking and also for auxiliary heating of the vehicle.

Another object of my invention is to protect the motor controlling and heating resistors on a vehicle against overheating in the event of failure of the ventilating fan which circulates air over the resistors and through the vehicle.

Other objects of my invention will be explained fully hereinafter or will be apparent to those skilled in the art.

In practicing my invention, the resistor which is provided for limiting the field flashing current during the initial stage of dynamic braking may also be utilized for auxiliary heating of the vehicle at all times except during the first few steps of dynamic braking. Provision is made for interrupting the control circuits for the vehicle in the event of failure of the ventilating fan, thereby preventing operation of the vehicle and overheating of the resistor elements.

For a fuller understanding of the nature and objects of my invention, reference may be had to the following detailed description, taken in conjunction with the accompanying drawings, in which:

Figures 1A and 1B, when combined, constitute a diagrammatic view of a control system embodying my invention;

Fig. 2 is a chart showing the sequence of operation of part of the apparatus illustrated in Figs. 1A and 1B; and Fig. 3 is a diagrammatic view illustrating a modification of the invention shown in Figs. 1A and 1B.

Referring to the drawings, the system shown therein comprises a motor 10 having an armature winding 11 and a series field winding 12, a line switch LS and a switch M for connecting the motor to power conductors 13 and 14, thereby supplying power to the motor through current collectors 15 and 16, respectively; a pair of switches B1 and B2 for establishing dynamic braking connections for the motor, a switch E for connecting the field winding 12 across the power conductors 13 and 14 in series with a resistor $R_a$ during a portion of the dynamic braking cycle to insure that the dynamic braking action of the motor builds up quickly, and a switch H for connecting the resistor $R_a$ across the power conductors to utilize the heat from the resistor for preheating the vehicle or for supplementing the heat obtained from the accelerating and braking resistors during the operation of the vehicle.

As explained hereinbefore, it is sometimes desirable to increase the amount of heat obtained from the usual accelerating and braking resistors during the operation of the vehicle and it is also necessary to provide a means of preheating the vehicle before starting on a run. It is also desirable to provide a means for flashing the field winding of the motor 12 during the initial stage of dynamic braking. In order to reduce the amount of equipment required for operating the vehicle to a minimum, I have devised the present scheme for utilizing the field flashing resistor for preheating the vehicle and also as a source of auxiliary heat during the operation of the vehicle.

The switches E and H are provided for connecting the resistor $R_a$ in the proper circuits for either field flashing or for heating the vehicle. Since the resistor cannot be connected in the field flashing circuit at the same time that it is connected in the heating circuit, the switches E and H are so interlocked that the switch H cannot be closed to connect the resistor $R_a$ in the heating circuit unless the switch E is opened. In this manner, the switch H may be closed at all times during the operation of the vehicle except when the switch E is closed to flash the field winding 12 which is only during the initial part of the dynamic braking period.

In order to control the motor current during the accelerating and dynamic braking periods, the usual resistor R is provided which is shunted from the motor circuit, step-by-step, by means of resistor shunting switches R1, R2, R3, R4, R7 and R8, which are actuated in sequential relation, as shown in the sequence chart in Fig. 2, during both the accelerating and the braking cycles. A pair of field shunting switches F1 and F2 are provided for shunting the field winding 12 through a reactor 17 and a resistor 18 in order to secure maximum speed of the motor 10 in a manner well known in the art.

As shown, the actuating coil of the switch F1 is so connected across the armature 11 when the dynamic braking connections are established that the energization of the coil is proportional to the voltage generated by the armature. Therefore, the switch F1 is responsive to the speed of the motor and the operation of the switch is a function of the motor speed. In this manner, additional shunting of the field windings is obtained at high motor speeds, thereby reducing the current generated in the armature when dynamic braking is applied during high speed operation.

In order that the sequence of operation of the resistor shunting switches may be controlled by interlock progression with a relatively few number of interlocks on the switches, each switch is provided with a closing coil and a holding coil. The closing coil is energized to close the switch after which the holding coil is energized to retain the switch in the closed position, it being unnecessary to maintain the closing coil energized after the holding coil becomes energized.

In accordance with the usual practice, the progression of the resistor shunting switches, both during acceleration and dynamic braking, is automatically controlled by a current limit relay LR, thereby preventing an excessive amount of current flowing through the motor windings. The relay LR is provided with the usual series coil winding 19, which is connected in the armature circuit for the motor 10, and a calibrating winding 20 which is connected across the armature winding 11 of the motor through an interlock 21 on the switch B2 during dynamic braking to change the calibration of the relay LR during the dynamic braking period.

In addition to the windings 19 and 20, the relay LR is also provided with a shunt winding 22 which is energized when the control has completed its sequence of operation, either during the accelerating or the braking cycles. The excitation of the shunt coil 22 causes the limit relay to be held in the open position. The holding of the limit relay in the open position disconnects all the closing coils of the resistor shunting switches and the field shunting switch F2 from the line and only the holding coils remain energized after the control sequence is completed. As is fully described in my copending application Serial No. 347,687, filed July 26, 1940, the energization of the coil 22 is controlled by interlocks provided on the resistor shunting switches and the field shunting switch F2. In this manner, the temperature of the closing coils is materially reduced since they are no longer continuously energized and, furthermore, a saving in energy required to operate the control equipment is effected.

As described in my foregoing copending application, dynamic braking, coasting and accelerating or application of power to the vehicle, are all controlled by a controller MC which may be of the cam type and pedal or foot operated, if desired. As shown, the controller MC is so constructed that one portion of the controller is utilized for dynamic braking, another portion for coasting, and still another portion for accelerating.

When the controller is actuated from its normal or braking position, it passes through a coasting position and then through the accelerating positions, the maximum speed of the vehicle being obtained by actuating the controller to the full power position at which time the switch F2 is closed to shunt the field winding of the motor through the reactor 17. Beginning at the full power position, the first initial motion of the controller in the backward direction changes the motor from short field to full field. Further movement towards the coasting position begins to insert resistance in series with the motor, thereby softening the "shut-off" of power. Passing through the coasting position, at which time the motor is disconnected from the power conductors, the braking position is reached. The resistor R is shunted from the motor circuit by the resistor shunting switches which are under the control of the limit relay LR.

In order to utilize the heat from the resistors R and Ra for heating the vehicle, these resistors are enclosed in a duct 23 which is provided for conducting the heat to the interior of the vehicle (not shown). A fan 24 is provided for circulating air over the resistors and into the vehicle, thereby reducing the temperature of the resistors and supplying the necessary heat for warming the interior of the vehicle. The fan 24 may be driven by a motor 25 which also drives a generator 26 for charging a battery 27. In accordance with the usual practice, a battery cutout 28 is provided for preventing the battery 27 from discharging through the generator when the generator voltage is below a predetermined point.

In order to prevent the operation of the vehicle in case the fan 24 is not circulating air over the resistors R and Ra to prevent them from being over-heated, a relay C is provided for preventing the operation of the control equipment for the vehicle when the fan 24 is not operating. As shown in Fig. 1A, the actuating coil of the relay C is connected across the terminals of the generator 26 through a control switch 29. Thus, the coil of the relay C is responsive to the voltage of the generator and the contact members of the relay will not be closed unless the motor 25 is driving the generator 26 at a speed which generates sufficient voltage to operate the relay C. Since the fan 24 is connected to the same shaft as the generator 26, the fan 24 will be circulating air over the resistors when the generator 26 is operating.

It will be noted that the actuating coil of the switch H is connected across the terminals of the generator 26 through a control switch 31 and an interlock 32 on the switch E. Thus, the actuating coil of the switch H is also responsive to the voltage of the generator 26 and the resistor Ra cannot be connected across the power conductors to preheat the vehicle unless the motor 25 is driving the generator 26 and the fan 24 to circulate air over the resistor Ra. In this manner, it is not necessary to close the switch 29 to operate the relay C during the preheating period. However, the resistor Ra is protected from over-heating in the same manner as the resistor R. As explained hereinbefore, the interlock 32 on the switch E prevents switch H from being closed while the switch E is closed to connect the resistor Ra in the field circuit.

In order that the functioning of the foregoing equipment may be more clearly understood, the operation of the system will now be described in more detail. Assuming that it is desired to accelerate the vehicle at the maximum rate, the controller MC is actuated to its last or full power position, it being first necessary to start the motor 25 in the usual manner to operate the fan 24 and also to close the switch 29 to connect the actuating coil of the relay C across the generator 26, thereby closing the contact members of the relay C in the manner hereinbefore described. Since it is assumed that the vehicle is starting from standstill, nothing happens as the controller is moved through the braking and coasting positions.

When the first accelerating position is reached, the switches LS, RI, and M are closed to connect the motor across the power conductors 13 and 14 in series with the resistor R. The energizing circuit for the closing coil of the switch LS may be traced from the positive power conductor 13 through the current collector 15, conductor 35, contact members 36 and 37 on the controller MC, conductor 38 and interlock 39 on the switch BI, conductor 41, the actuating coil of the switch LS, conductor 42, the contact members of the relay C, conductor 43 and the current collector 16 through the power conductor 14. The energizing circuit for the switch M extends from the conductor 41 through the actuating coil of the switch M to the conductor 42 and thence to the negative power conductor through the circuit previously traced.

Following the closing of the switch LS, the closing coil of the switch RI is energized through a circuit which may be traced from the previously energized conductor 38 through an interlock 44 on the switch LS, conductor 45, an interlock 46 on the switch R7, conductor 47, the closing coil of the switch RI, conductor 48, the contact members of the relay LR, conductor 42, and the contact members of the relay C to the conductor 43. Following the closing of the switch RI the holding coil of this switch is energized through a circuit which extends from the previously energized conductor 47 through an interlock 49 and the holding coil to the conductor 42 and thence to the negative conductor through the circuit previously traced.

Following the closing of the switch RI, the switch R2 is closed to shunt one step of the resistor R from the motor circuit. The energizing circuit for the switch R2 may be traced from the previously energized conductor 47 through an interlock 51 on the switch RI, conductor 52, the closing coil of the switch R2, conductor 48 and the contact members of the relay LR to the negative conductor 42. The holding coil of the switch R2 is energized through an interlock 53 when the switch R2 is actuated to the closed position.

When the controller MC reaches the second accelerating position, the switch R3 is closed to shunt another step of the resistor R from the motor circuit. The energizing circuit for the switch R3 may be traced from the previously energized conductor 52 through contact members 54 on the controller MC, conductor 55, an interlock 56 on the switch R, conductor 57, the closing coil of the switch R3, conductor 48 and the contact members of the relay LR to the negative conductor 42. The holding coil of the switch R3 is energized through an interlock 58 on the switch R3 when it is actuated to the closed position.

Following the closing of the switch R3, the closing coil of the switch R4 is energized through a circuit which extends from the previously energized conductor 52 through an interlock 59 on the switch R3, conductor 61, the closing coil of the switch R4, conductor 48, and the contact members of the relay LR to the negative conductor 42. The holding coil of the switch R4 is energized through an interlock 62 which is closed when the switch R4 is actuated to the closed position.

Following the closing of the switch R4, the switch R7 is closed. The energizing circuit for the closing coil of the switch R7 may be traced from the previously energized conductor 45 through an interlock 63 on the switch R4, conductor 64, the closing coil of the switch R7, conductor 48, and the contact members of the relay LR to the conductor 42. The holding coil for the switch R7 is energized when the switch R7 is closed, the energizing circuit extending from the conductor 45 through the holding coil, conductor 65, and an interlock 66 to the conductor 42.

When the controller MC is moved to the third accelerating position, the closing coil of the switch R8 is energized through a circuit which may be traced from the conductor 45 through contact members 67 of the controller MC, conductor 68, and interlock 69 on the switch R7, the closing coil of the switch R8, conductor 71, an interlock 72 on the switch R2, the conductor 48, and the contact members of the relay LR to the conductor 42. The holding coil for the switch R8 is energized through the interlock 66 on the switch R7 in the same manner as the holding coil for the switch R7.

As shown in the sequence chart, the switches RI, R2, R3, and R4 are opened upon the closing of the switch R7. Thus, the resistor R is connected in the motor circuit in two parallel paths and the switches R2, R3, R4 and RI are reclosed in the order shown in the sequence chart to shunt the resistor completely from the motor circuit. Since the operation of the resistor shunting switches by interlock progression under the control of the limit relay LR is well known in the railway control art, it is believed to be unnecessary to give a more detailed explanation of the operation of these switches.

As previously explained, the field shunting switch F2 is closed at the end of the accelerating cycle to shunt the field winding 12 through the reactor 17. The energizing circuit for the closing coil of the switch F2 may be traced from the conductor 45 through contact members 73 on the controller MC, conductor 74, an interlock 75 on the switch R8, conductor 76, an interlock 77 on the switch RI, conductor 78, an interlock 79 on the switch M, conductor 81, the closing coil of the switch F2, conductor 48, and the contact members of the relay LR to the conductor 42. The holding coil for the switch F2 is energized through an interlock 82 on the switch F2 and conductor 80.

As explained hereinbefore, the coil 22 of the relay LR is energized at the end of the accelerating cycle to open the contact members of the limit relay, thereby deenergizing the closing coils on the resistor shunting switches and the switch F2. The energizing circuit for the coil 22 may be traced from the previously energized conductor 41 through an interlock 83 on the switch F2, conductor 84, a resistor 85, and the coil 22 to the negative conductor 42. In this manner, the closing coils are deenergized to prevent overheating of these coils. However, the resistor shunting switches and the field shunting switch F2 are maintained closed by the holding coils during operation of the vehicle. It will be understood that the holding coils require less current than the closing coils since it is only necessary for them to retain the switches in the closed position after they have once been closed by the closing coil.

When it is desired to decelerate the vehicle by means of dynamic braking, the controller MC is returned to the normal or braking position. It will be understood that the motor is disconnected from the power source when the controller is passing through the coasting position since all of the control equipment is deenergized. When the controller reaches the braking position, the switch R1, B1, B2, and E are closed. The switches R1, B1 and B2 establish a dynamic braking circuit for the armature of the motor through the resistor R and the switch E, in conjunction with the switch B1, connects the field winding 12 of the motor across the power conductor to excite the field winding, thereby causing a rapid build-up of the motor current to assure a quick braking effect. The resistor Ra and an additional resistor 86 are connected in the field flashing circuit to limit the field current at this time.

The energizing circuit for the switch B1 may be traced from the conductor 35 through contact members 36 and 87 of the controller MC, conductor 88, an interlock 89 on the switch M, conductor 74, an interlock 91 on the switch LS, conductor 92, and the closing coil of the switch B1 to the negative conductor 42. The energizing circuit for the switch B2 extends from the conductor 92 through the coil of the switch B2 to the negative conductor 42.

Following the closing of the switch B2, the switch R1 is closed. The energizing circuit for the switch R1 may be traced from the conductor 35 through the contact members 36 of the controller MC, conductor 93, an interlock 94 on the switch B2, conductor 45, the interlock 46 on the switch R7, conductor 47, the closing coil of the switch R1, conductor 48 and the contact members of the relay LR to the conductor 42. The energizing circuit for the coil of the switch E extends from the previously energized conductor 92, through an interlock 95 on the switch R8, conductor 96 and the coil of the switch E to the conductor 42.

The resistor shunting switches R2, R3, R4, R7 and R8 are closed in the order shown in the sequence chart to shunt the resistor R from the motor circuit in the same manner as during acceleration of the vehicle. It will be noted that the switch E is opened upon the closing of the switch R8. Thus, the switch H may be closed at any time after the switch E is opened to energize the resistor Ra for auxiliary heating of the vehicle. Since the resistor Ra is actually energized during the time that it is connected in the field flashing circuit, it will be seen that this resistor is available for heating the vehicle at all times during the operation of the vehicle as well as for preheating before the vehicle is actually put in operation.

As explained hereinbefore, the coil 22 of the relay LR is energized at the end of the braking sequence, that is, when the operation of the resistor shunting switches is completed. The energizing circuit for the coil 22, at this time, may be traced from the previously energized conductor 74 through the interlock 75 on the switch RA, conductor 76, the interlock 77 on the switch R1, conductor 78, an interlock 97 on the switch B1, conductor 84, the resistor 85, and the coil 22 to the conductor 42. In this manner, the relay LR is actuated to its raised position to deenergize the closing coils of the resistor shunting switches after they have completed their sequence of operation during dynamic braking in the same manner as during acceleration.

It will be noted that the energization of all the control equipment for operating the vehicle is dependent upon the operation of the relay C. Thus, as explained hereinbefore, it is impossible to operate the vehicle unless the motor 25 is driving the fan 24 to dissipate the heat produced in the resistors R and Ra, thereby protecting these resistors from over-heating.

In the modification of the invention shown in Fig. 3 in which similar parts of the apparatus are designated by the same reference characters as in Fig. 1A, the operation of the relay C is directly responsive to the pressure of the air circulated by the fan 24. As shown in Fig. 3, contact members 98 which are closed by a vane 99 disposed in the path of the air circulated by the fan 24 are connected in the energizing circuit for the coil of the relay C. Since it is necessary for the fan to be developing a predetermined air pressure to close the contact members 98 to complete the energizing circuit for the relay C, it is impossible to operate the vehicle unless the fan is circulating air over the resistor R. Furthermore, it is impossible to close the switch H to energize the resistor Ra to preheat the vehicle unless the fan 24 is operating since the energizing circuit for the coil of the switch H includes the contact members of the relay C thereby making it necessary for the relay C to be closed before the switch H can be operated. The switch H is interlocked with the switch E in the same manner as hereinbefore described to prevent the switch H from being closed while the switch E is closed.

From the foregoing description, it is evident that I have provided for heating an electrically propelled vehicle under all operating conditions with a minimum amount of equipment. Furthermore, the resistors which are utilized for heating the vehicle are protected from over-heating at all times during the operation of the vehicle or during the time that the vehicle is being preheated prior to being put into operation.

Since many modifications may be made in the apparatus and arrangement of parts without departing from the spirit of my invention, I do not wish to be limited other than by the scope of the appended claims.

I claim as my invention:

1. In a motor control system, in combination, a motor for propelling a vehicle, switching means for connecting the motor to a power source, additional switching means for establishing dynamic braking connections for the motor, a resistor for controlling the motor current during acceleration and dynamic braking of the vehicle, an additional resistor for controlling the field flashing current during dynamic braking, and means for energizing said additional resistor from the power source independently of said switching means to heat the vehicle.

2. In a motor control system, in combination, a motor for propelling a vehicle, switching means for connecting the motor to a power source, additional switching means for establishing dynamic braking connections for the motor, a resistor for controlling the motor current during acceleration and dynamic braking of the vehicle, an additional resistor for controlling the field flashing current during dynamic braking, and switching means for connecting said additional resistor to the power source either to heat the vehicle or to control the field flashing current during dynamic braking.

3. In a motor control system, in combination, a motor for propelling a vehicle, switching means for connecting the motor to a power source, additional switching means for establishing dynamic braking connections for the motor, a resistor for controlling the motor current during acceleration and dynamic braking of the vehicle, an additional resistor for controlling the field flashing current during dynamic braking, switching means for connecting said additional resistor to the power source either to heat the vehicle or to control the field flashing current during dynamic braking, and means for preventing the heating connections from being established while the field flashing connections are established.

4. In a motor control system, in combination, a motor for propelling a vehicle, switching means for connecting the motor to a power source, additional switching means for establishing dynamic braking connections for the motor, a resistor for controlling the motor current during acceleration and dynamic braking of the vehicle, an additional resistor for controlling the field flashing current during dynamic braking, switching means for connecting said additional resistor to the power source either to heat the vehicle or to control the field flashing current during dynamic braking, and interlocking means on said last-named switching means for preventing the heating connections from being established while the field flashing connections are established.

5. In a motor control system, in combination, a motor for propelling a vehicle, switching means for connecting the motor to a power source, additional switching means for establishing dynamic braking connections for the motor, a resistor for controlling the motor current during acceleration and dynamic braking of the vehicle, an additional resistor for controlling the field flashing current during dynamic braking, means for energizing said additional resistor from the power source independently of said switching means to heat the vehicle, a fan for circulating air over said resistors, and means responsive to the speed of said fan for preventing the energization of said resistors.

6. In a motor control system, in combination, a motor for propelling a vehicle, switching means for connecting the motor to a power source, additional switching means for establishing dynamic braking connections for the motor, a resistor for controlling the motor current during acceleration and dynamic braking of the vehicle, an additional resistor for controlling the field flashing current during dynamic braking, means for energizing said additional resistor from the power source independently of said switching means to heat the vehicle, a fan for circulating air over said resistors, and control means responsive to the speed of said fan for preventing the operation of said switching means to energize said resistors.

7. In a motor control system, in combination, a motor for propelling a vehicle, switching means for connecting the motor to a power source, additional switching means for establishing dynamic braking connections for the motor, a resistor for controlling the motor current during acceleration and dynamic braking of the vehicle, an additional resistor for controlling the field flashing current during dynamic braking, and means for energizing said additional resistor from the power source independently of said switching means to heat the vehicle, a fan for circulating air over said resistors, a control relay for preventing the operation of said switching means to energize said resistors, and means responsive to the speed of said fan for controlling the operation of said control relay.

8. In a motor control system, in combination, a motor for propelling a vehicle, switching means for connecting the motor to a power source, additional switching means for establishing dynamic braking connections for the motor, a resistor for controlling the motor current during acceleration and dynamic braking of the vehicle, an additional resistor for controlling the field flashing current during dynamic braking, and means for energizing said additional resistor from the power source independently of said switching means to heat the vehicle, a fan for circulating air over said resistors, a motor for driving said fan, a generator driven by said motor, and means responsive to the speed of said generator for preventing the energization of said resistors.

9. In a motor control system, in combination, a motor for propelling a vehicle, switching means for connecting the motor to a power source, additional switching means for establishing dynamic braking connections for the motor, a resistor for controlling the motor current during acceleration and dynamic braking of the vehicle, an additional resistor for controlling the field flashing current during dynamic braking, and means for energizing said additional resistor from the power source independently of said switching means to heat the vehicle, a fan for circulating air over said resistors, a motor for driving said fan, a generator driven by said motor, and a relay responsive to the voltage of said generator for preventing the energization of said resistors.

10. In a motor control system, in combination, a motor for propelling a vehicle, switching means for connecting the motor to a power source, additional switching means for establishing dynamic braking connections for the motor, a resistor for controlling the motor current during acceleration and dynamic braking of the vehicle, an additional resistor for controlling the field flashing current during dynamic braking, and means for energizing said additional resistor from the power source independently of said switching means to heat the vehicle, a fan for circulating air over said resistors, a control relay for preventing the operation of said switching means to energize said resistors, and means responsive to the air pressure developed by said fan for controlling the operation of said control relay.

BASCUM O. AUSTIN.